WILLIAM KERR, Jr.

Improvement in Chucks for Watchmakers' Lathes.

Figure 1:
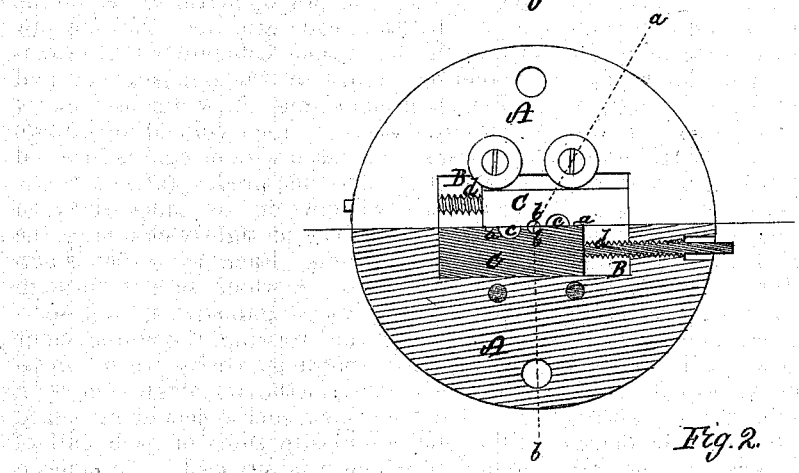

No. 115,324.  Patented May 30, 1871.

on line a b of Fig. 1.

Witnesses.  
Chas. F. Dennis.  
Edward Griffith.

William Kerr Jr  
By his Attorney,  
Frederick Curtis

UNITED STATES PATENT OFFICE.

WILLIAM KERR, JR., OF BOSTON, MASSACHUSETTS.

IMPROVEMENT IN CHUCKS FOR WATCHMAKERS' LATHES.

Specification forming part of Letters Patent No. 115,324, dated May 30, 1871; antedated May 16, 1871.

*To all to whom these presents shall come:*

Be it known that I, WILLIAM KERR, Jr., of Boston, in the county of Suffolk and Commonwealth of Massachusetts, have made an invention of a new and useful Chuck for Watchmaker's and others' use; and do hereby declare the following to be a full, clear, and exact description thereof, due reference being had to the accompanying drawing making part of this specification, and in which—

Figure 2:
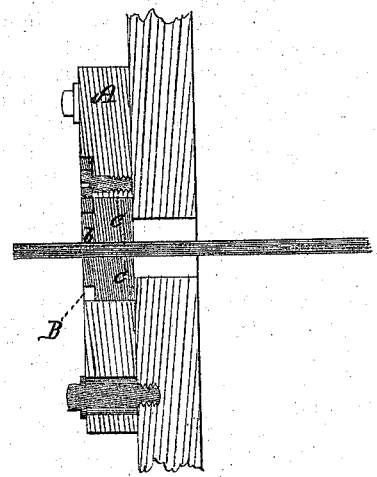
Figure 3:
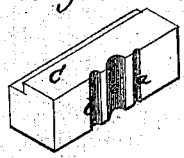

Figure 1 is a parti-sectional elevation, and Fig. 2 a transverse section, of a chuck which embodies my invention; Fig. 3 being a perspective view of one of its clamping plates or jaws, to be hereinafter referred to.

This improved chuck consists, in part, of two rectangular metallic blocks or plates, disposed and sliding against one another within an orifice formed in a circular disk, each being operated longitudinally by a screw at one end and by a spring at the other in such manner that the passage of one plate upon another is effected in a manner to bring into coincidence some two of a series of notches formed in the adjacent faces of each plate in manner and for purposes as hereinafter stated, the purpose of the invention being not only to produce a chuck which, being perfectly accurate, shall adapt itself to objects of varying diameter, but which may be understood and used by persons of ordinary intelligence, and adjusted to the requisite object in a very short space of time.

The accompanying drawing represents, at A, a metallic circular disk having a rectangular oblong orifice, B, cut centrally through it from face to face. C C represent two twin-shaped rectangular oblong blocks of metal having a series of differential semicircular grooves or depressions, $a\ b\ c$, cut across one of their faces, as represented in Fig. 3 of the accompanying drawing, and at right angles to their longest axis. In the present instance, in order to carry out and to explain the characteristic feature of my invention, I have produced in each bar or jaw, as it may properly be termed, three cross-grooves, $a\ b\ c$, of varying diameters, and it will be observed that the two jaws are so arranged that the longest outer or end groove of one jaw is arranged in proximity to the smallest end groove of its fellow jaw; hence upon sliding one jaw upon the other in the proper direction, each groove of the one jaw will, at the same time, coincide with the corresponding groove of the opposite jaw and produce a circular hole. It will consequently be apparent that if, upon coinciding of two like-shaped grooves, a wire or drill is inserted in the whole thus acquired, a further movement of the two jaws in the same direction will have the effect of tightly clamping the wire or drill therein. Each jaw or bar is actuated by a screw, $d$, which screws through the disk A and abuts against it, as represented in Fig. 1 of the drawing, the employment of these screws enabling a very powerful pressure to be exerted upon the two jaws to confine an object between them, such object being seized by diagonally opposite sides of each half of the hole in which it is situated. The holes $a\ b\ c$ are drilled through the jaws C C while they (the jaws) are revolving in a lathe; consequently they are, of necessity, at right angles to the longest axis of such jaws—a very important fact. Each jaw may be forced in contact with its screw by means of a spiral spring or its equivalent, which is inserted within a cavity drilled in the disk A, and abutting against it; or any equivalent may be adopted for the spring. The outer or front face of the disk A is provided with screws or washers to overlap the edges of the jaws C C and prevent their misplacement.

When in operation, the disk A is to be attached, in an adjustable manner, to the face-plate of the lathe, and the wire or drill embraced within the jaws C C disposed, as nearly as possible, in the center of the orifice B. Upon putting the disk in revolution and pressing a screw-driver or other object against such revolving wire or drill it is instantly forced into the center of motion of the lathe, which being done, the disk is to be lightly clamped to the face-plate.

By the disposition of the grooves of the jaws as herein explained it will be perceived that the portion of one jaw, which extends beyond the center of the disk in one direction, is counterbalanced by its fellow jaw, which extends to a like extent in the opposite direction, thus acquiring an even and regular motion upon the chuck, which is a matter of very great importance.

Claim.

I claim—

The sliding rectangular blocks or jaws C C, arranged in the chuck, each operated longitudinally by a screw at one end and by a spring at the other, substantially as and for the purpose set forth.

WILLIAM KERR, Jr.

Witnesses:
 FRED. CURTIS,
 EDW. GRIFFITH.